United States Patent [19]
O'Conner

[11] Patent Number: 5,914,683
[45] Date of Patent: Jun. 22, 1999

[54] ULTRA HIGH RESOLUTION RANGING UNIT

[76] Inventor: Joe S. O'Conner, Box 43, Woodland Mills, Tenn. 38271

[21] Appl. No.: 08/927,423

[22] Filed: Sep. 11, 1997

Related U.S. Application Data

[60] Provisional application No. 60/026,102, Sep. 12, 1996.

[51] Int. Cl.[6] ....................................... G01S 13/36
[52] U.S. Cl. .......................... 342/127; 342/129; 342/135; 342/103
[58] Field of Search ................................ 342/127, 128, 342/129, 135, 102, 103

[56] References Cited

U.S. PATENT DOCUMENTS

| | | | |
|---|---|---|---|
| 3,932,871 | 1/1976 | Foote | 342/28 |
| 4,072,947 | 2/1978 | Johnson | 342/103 |
| 4,079,377 | 3/1978 | Zur Heiden et al. | 342/109 |
| 4,200,871 | 4/1980 | Roeder et al. | 342/78 |
| 4,291,309 | 9/1981 | Spiller et al. | 342/82 |
| 4,321,602 | 3/1982 | Kipp | 342/103 |
| 4,521,778 | 6/1985 | Knepper | 342/134 |
| 4,901,083 | 2/1990 | May et al. | 342/128 |
| 4,931,799 | 6/1990 | Wen et al. | 342/110 |
| 5,075,863 | 12/1991 | Nagamune et al. | 364/561 |
| 5,172,123 | 12/1992 | Johnson | 342/200 |
| 5,361,072 | 11/1994 | Barrick et al. | 342/133 |

*Primary Examiner*—John B. Sotomayor
*Attorney, Agent, or Firm*—James Creighton Wray; Meera P. Narasimhan

[57] ABSTRACT

A low cost, real time, remote sensor device for accurately measuring distance to an object with a resolution of 1 millimeter or better using phase information from either electromagnetic or acoustic energy. The device repetitiously transmits a swept frequency and decodes the resulting echo to produce a phase gate which is then converted to an accurate measurement of the range from each sweep. A method for measuring the time between two known phase points on a return signal is employed to determine the range measurement. Since the phase of the signal is used to determine range, the resolution is not dependent on bandwidth.

22 Claims, 9 Drawing Sheets

ULTRA HIGH RESOLUTION RANGING UNIT

This application claims the benefit of U.S. Provisional application Ser. No. 60/026,102, filed Sep. 12, 1996.

BACKGROUND OF THE INVENTION

Most devices to date use the frequency response of either pulses or a swept frequency technique to determine range. Many systems have performed Fourier transforms in one way or another to extract the frequency information with the limitation that at least one full cycle of information is needed to determine a particular frequency response. The following formulas have been used to describe the optimum resolution of pulse and swept frequency systems to date.

$R=C\tau/2$ for pulse systems where

R=range resolution in meters, $c=3\times10_8$=speed of light, $\tau$=width of the transmitted pulse and R=150/BW(MHz)

where

R=range resolution in meters

BW=system bandwidth in MHz

In other words, the higher the bandwidth of a system, the greater the optimum resolution. That results in systems of high resolution that require high bandwidths which become increasingly difficult to implement with higher resolutions.

SUMMARY OF THE INVENTION

The device is a low cost, real time, electronic remote sensor which can accurately measure distance to an object with a resolution of 1 millimeter or better using phase information from either electromagnetic or acoustic energy. Resolution is independent of range. The device repetitiously transmits a swept frequency and decodes the resulting echo to produce a phase gate which is then converted to an accurate measurement of the range from each sweep. Typical measurement times are 10 milliseconds, but the device can vary the measurement times at least an order of magnitude above or below this time depending on configuration. Although resolution at present is about 1 millimeter, the device can measure to the micron range in resolution, being limited only by the phase stability of the transceiver. The minimum range of the device is determined by the transceivers bandwidth. With a 24 GHz rf transceiver, the minimum range with 350 MHz sweep is about 20 cm. With an acoustic transceiver, the minimum range is a few millimeters. The maximum range is limited only by the ability of the device to detect a signal above the noise of the receiver.

With a 24 GHz rf transceiver having 5 milliwatts of power and a 15 cm diameter lens horn antenna, the maximum range is currently about 5 km. With a larger antenna, or more power, or with greater receiver sensitivity, or a combination of the above, the range is unlimited. The system maintains a relatively low cost up to 100 km or more. Although not necessary for general measurements, by using an inexpensive small passive corner reflector at the remote range location, a point echo is assured, thus producing an accurate distance measurement to one and only one location. Generally, in air and space mediums, range measurements from 30 cm up are made with an rf transceiver. For shorter distances from a few millimeters or for measurements in other mediums, an acoustic transceiver is used.

Using the same circuitry switched to another mode of operation, the device can detect and measure the distance to objects within a range window, ignoring other objects. The device can also detect and measure the velocity of very fine movements through an additional process.

Although there are several processes which take place in the device, all circuitry fits on a standard 4 inch ×6 inch printed circuit board using standard off-the-shelf components. The cost for the device is low when compared to other devices performing similar functions. The expected production cost for the device should fall below $200 and $500 depending on the configuration.

The device is unique in that it evaluates certain phase characteristics of the radar signal rather than frequency characteristics to determine range. Seven processing techniques are unique in the remote sensing device.

Three methods enhance the range resolution. Two methods suppress multipathing, sometimes called double range suppression. A method detects and measures the velocity of very fine movements A method programs detection, range measurements and velocity to a preselected range window.

This device processes not only the frequency information, but also the phase information in a swept frequency technique to determine range.

This new device uses the phase of the signal of one or more frequencies to determine range, thus resolution is not dependent on bandwidth. Limiting the bandwidth only limits the nearest range which can be measured. The device uses a Frequency Modulated Continuous Wave (FMCW) radar to produce a sine wave of which the frequency is indicative of the range. Although this processing is unique in its own, the sine wave is the standard output of FMCW systems. The device departs from other systems developed to date in that the invention does not measure the frequency of the wave, nor does it perform a Fourier transform on the wave to produce a spectral analysis. Instead, the invention processes the phase information of the sine wave to better than 1/360th of a cycle or 1 degree. Resolution is enhanced by 360 times that of other systems to date. Although 1 degree measurements are now made, that is not a limit. If the transceiver source is stable enough, the device can process to almost unlimited resolution.

The technique used in this device is to measure the time between two known phase points on a return signal. In the present invention, the time between the zero crossing or 0 degree phase point of the first sine wave return and the next zero crossing or 180 degree phase point is measured. The faster the timer used to measure this time, the better the resolution. Currently a 1.5 MHz timer is used to give increments of 0.667 microseconds on a return sine wave signal of 250 Hz at 30 cm for a theoretical resolution limit of 0.1 mm when the phase response of the transceiver and ramp are linear. However, as a result of these phase linearity limitations in the present transceiver, resolutions of 2 mm have been demonstrated at this near range. In the present invention, a resolution of less than 1 cm has been demonstrated at 20 meters range. Beyond 20 meters and up to 100 meters, the resolution does not degrade. No tests have been made yet beyond 100 meters. The physical limitations of the 5 mw transceiver presently used limit it to about 150 meters on a 1 square meter target.

Instead of the standard output where the range measurement is directly proportional to return frequency, the output of this device produces a signal whereby the phase time is inversely proportional to range. That is, as the frequency goes up, the shorter the phase time between each sine wave across the zero crossings. To keep these times from being exceptionally small, the time measurements between increasing numbers of zero crossings is increased with range with the result that high resolution is maintained out to the limits of the transceiver. As the range increases and the resulting number of sine wave crossings increases, the measurement time increases in blocks of 1 to 100 zero crossings to maintain high resolution.

Finding the zero crossings in a dynamic signal requires unique circuitry. The circuitry must first determine the first zero crossing, then the second, then the third and so on with high precision.

One application of the present invention is ship drift-off. Ships moored at docks need an inexpensive method to determine whether they are securely against the dock. This device has the resolution to measure even the slightest distance or movement change and to initiate an alarm if the ship drifts off the dock.

This device can also be applied to vehicle platooning, a future system where cars may be electronically locked together in trains. This device, one placed on the front of each car, issues the proper signals to maintain exact spacing between the cars.

The device may be employed as a remote strain gauge. The device can be placed on the superstructure, above or below a bridge or on the ground below to measure the vertical displacement and velocity of the displacement as vehicles cross. The invention may be placed on solid ground to the side of a bridge to measure the horizontal displacement.

Another application is for earthquake prediction and measuring plate movement. The device may be placed on one side of a fault to measure the plate movement over any length of time. Because it is real time, earthquakes of almost any magnitude in the area are also detected and the displacement of the ground measured.

The device may also be employed in volcanic prediction and to measure mountain bulging. By placing the device some kilometers away from a volcanic mountain and a corner reflector on the mountain, bulging can be measured. A major advantage when an rf transceiver is used is the ability of the device to see through smoke, clouds, fog, ash and rain.

The invention may also be employed in security and architectural systems. Programming the device to operate within a range window, the invention may be placed behind a radar transparent wall to detect objects of interest within a room or cavern. By scanning across an area and storing the data in a computer, a profile is generated to produce a picture below the surface.

These and further and other objects and features of the invention are apparent in the disclosure, which includes the above and ongoing written specification, with the claims and the drawings.

DETAILED DESCRIPTION OF THE PREFERRED EMBODIMENTS

Although the device described herein uses a tunable 24 GHz rf transceiver, any tunable phase stable transceiver may be used, including acoustic transceivers and lasers. The present invention processes information from commercially available transceivers to produce the high resolution.

Figure 1:
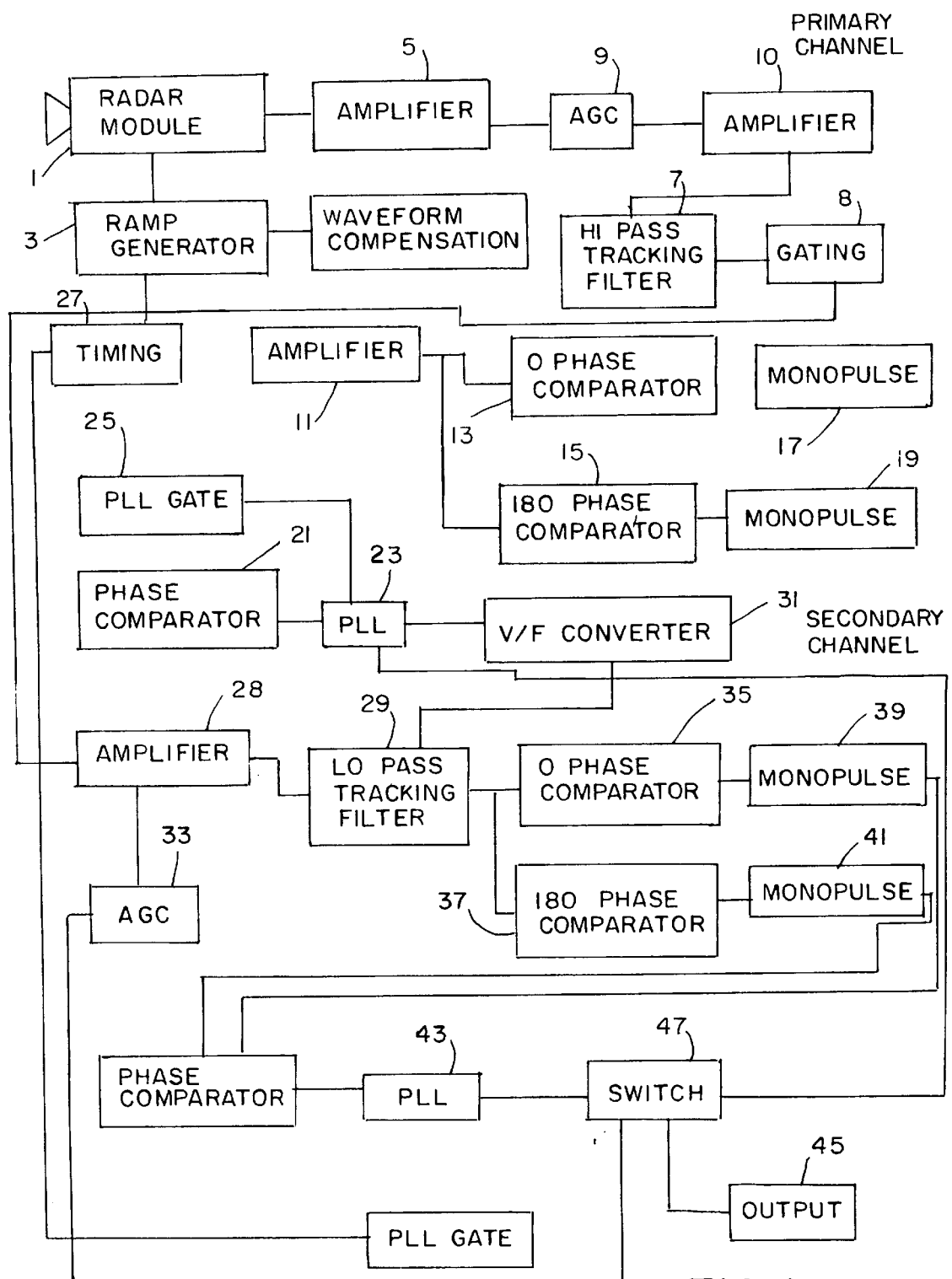
FIG. 1 is a block diagram of the first resolution enhancement method and multipath suppression.
Figure 4:
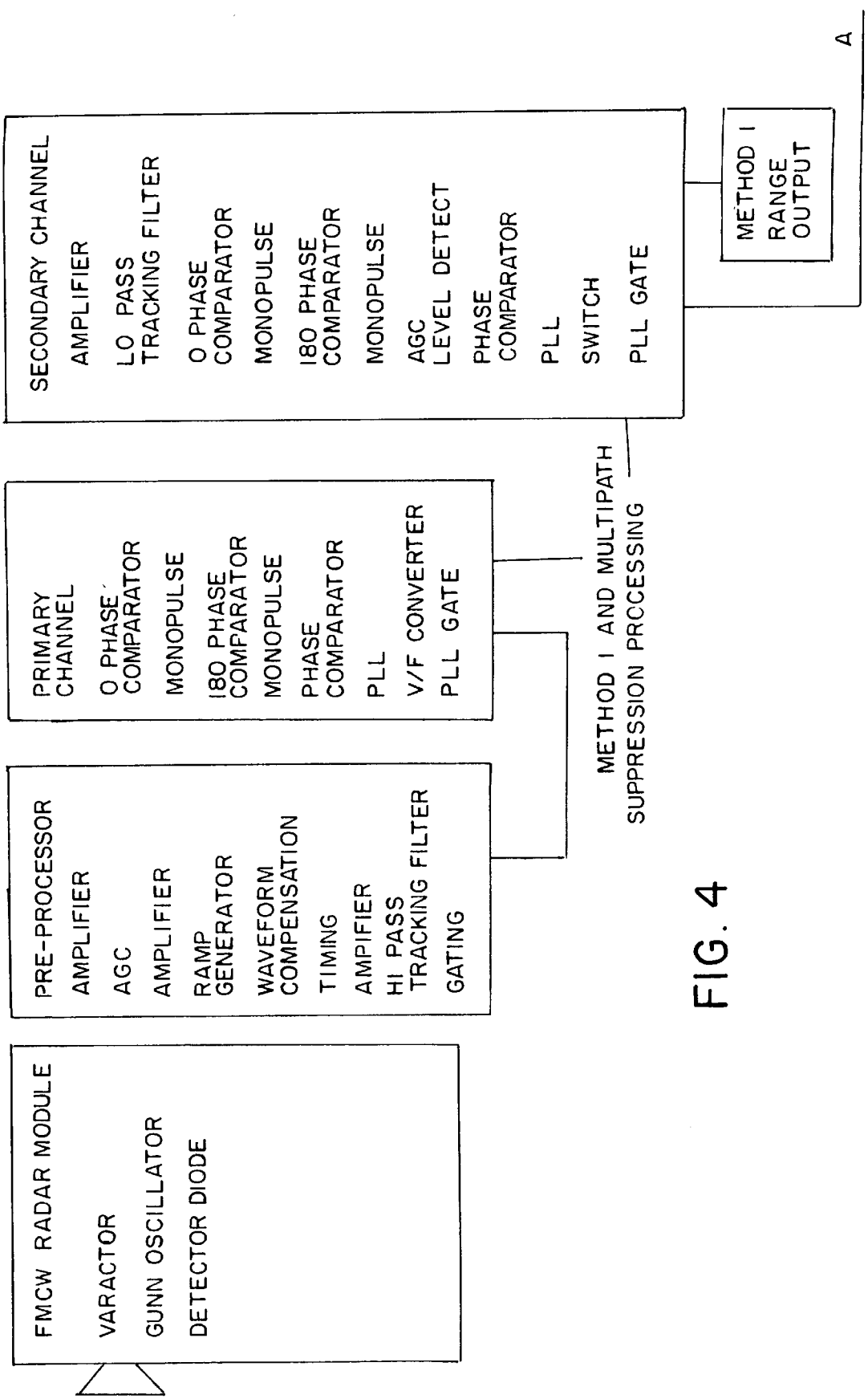
FIG. 4 is a simplified block diagram showing the first and second resolution enhancement methods with multipath suppression.
Figure 4A:
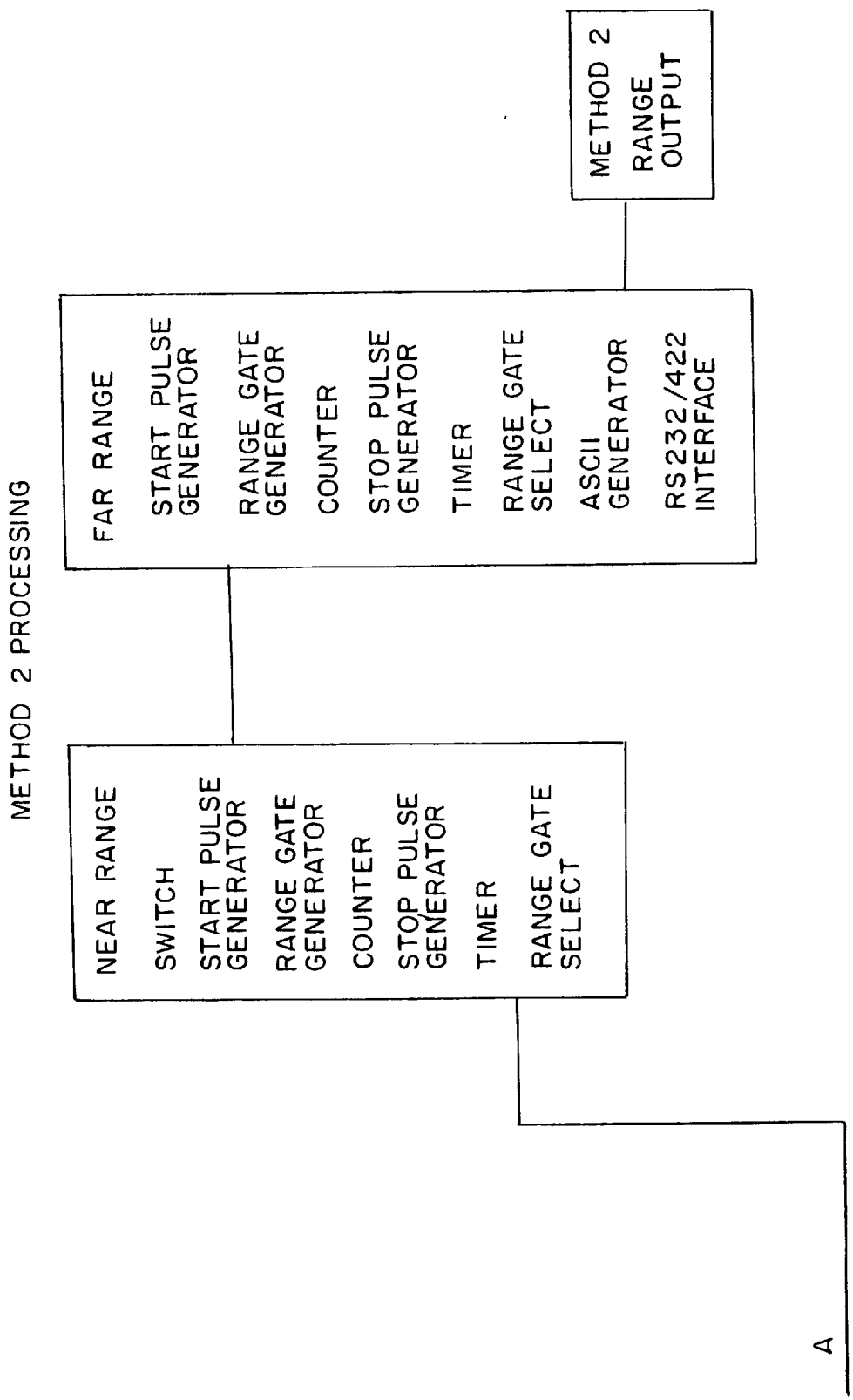
Figure 5:
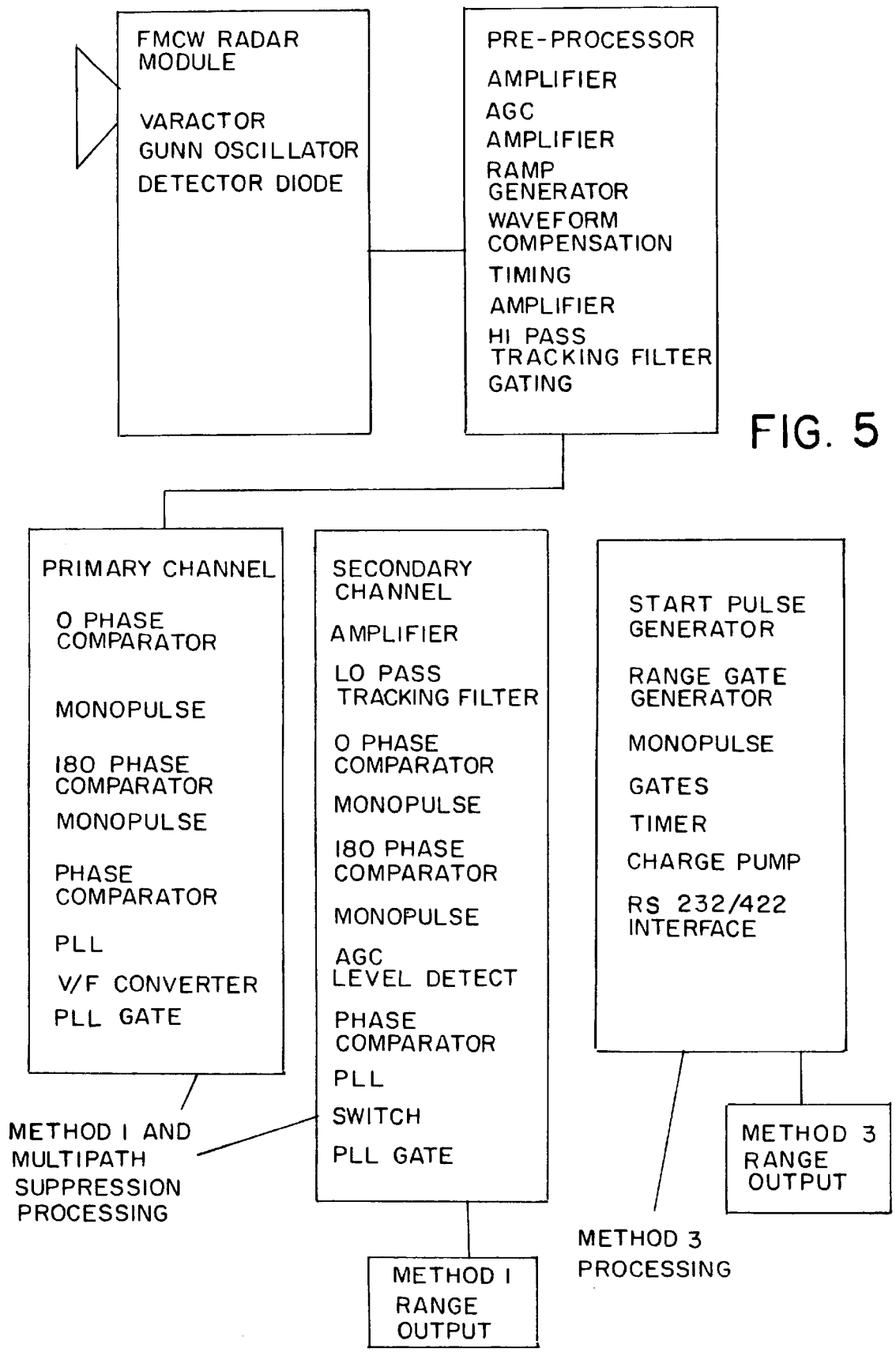
FIG. 5 is a simplified block diagram showing the first and third resolution enhancement methods with multipath suppression.

Although, the device has been demonstrated using a 24.2 to 24.55 GHz radar transceiver with a 150 mm lens horn antenna having a 3.5 degree, 3 dB beamwidth, any antenna which mates to the module may used. As shown in FIGS. 1, 4 and 5, the radar module 1 is a standard M/A Corn Frequency Modulated Continuous Wave (FMCW) device with 5 mw output from a standard Gunn diode source. The frequency is swept from 24.2 to 24.550 GHz by a varactor tuner driven by a 0 to 10 volt ramp 3. The receive echo is demodulated internal to the module by a Schottky receiver diode. The Gunn diode oscillates when 6.5 vdc is applied.

The energy from the Gunn diode is directed through the lens horn antenna to a remote point. The point reflects energy back through the lens horn onto the receiver diode. A demodulated FMCW electrical signal is then processed in a series of steps to ready the signal for high resolution measurement.

In the first step, a 10 volt peak to peak ramp is generated using a standard integrator circuit. The ramp is then amplified and a dc offset is added. The ramp is then sent to the varactor on the transceiver module to tune it. Currently, an 85% duty cycle up ramp is used to tune the transceiver over a bandwidth of 350 MHz. Although the ramp frequency used now is 100 Hz, a multitude of ramp frequencies can be used.

In the second step, the signal output from the radar modules 1 is amplified through an OP27 amplifier 5 from Analog Devices and the bandwidth limited through a high pass filter made of standard capacitors and resistors to frequencies of interest. The signal is then sent through an automatic gain control circuit (AGC) 9, consisting mainly of an MC3340 gain control integrated circuit from Motorola, to control the dynamic range of the signal for further processing. The signal is amplified 10 again and regulated through AGC to about a 1 volt p-p signal.

During the third step, the signal is again filtered through commercially available switched capacitor filters 7 to remove the band of frequencies which result in unwanted transients caused by the antenna and transceiver. Although any standard tunable high pass filter may be used, presently LMF100 clock tunable filters from National Semiconductor configured as high pass filters 7 are implemented to set the lower frequency cutoff. The lower frequency cutoff changes with the range being measured to limit the effects of transients and other noise. As the range increases, the filters track to a higher cutoff to further suppress unwanted low frequency transients.

In step four, the signal is then gated 8 to essentially eliminate unwanted signals which result from the flyback or reset of the ramp. Only that portion of the signal with the desired information is allowed through. The desired signal is first split into two channels. One channel, called the primary channel, the other channel called the secondary channel. At this point, two methods may be used for enhancing the range resolution. Both methods use the first method's circuitry for multipath suppression. If multipath suppression is not required, the channels are not split and only one channel of information is used.

In the first method, the primary signal is amplified 11, then converted to a digital signal through two LM393 comparators 13, 15. The first comparator 13 creates a pulse at a fixed point on the leading edge phase of each sine wave excursion. Conversely, the second comparator 15 creates a pulse at a fixed point on the trailing edge of each sine wave excursion. Each of the two signals is then sent to CD4538 monopulse devices 17, 19 where each pulse is shortened to a fixed length. Then the signals are added together through a phase comparator 21 resulting in double the normal frequency. Two channels are used in the present circuitry resulting in a phase pulse at about 0 degrees and 180 degrees on each excursion of the signal wave. Adding one extra comparator circuit improves the resolution by two, i.e., halves it. More comparators may be added to trigger on other phases of the signal wave such as at 45 degrees and 270 degrees to improve the resolution even more. Every two comparator channels added will improve the resolution by a factor of two as long as they are evenly divided on the signal wave.

Next the signal goes to a unique phase lock loop 23 circuit consisting of a CD4046 and peripheral components where a frequency is phase locked to the pulses. That phase locked loop (PLL) differs from a standard PLL's in that the phase error signal is gated 25 off during the flyback time of the ramp. The frequency of the PLL is locked to the range and stabilized by a time constant 27 corresponding to the ramp repetition frequency. The output of this PLL has two functions. One is that the PLL produces range information at ½ or better, depending on the number of comparator channels, the resolution of standard systems. The other function is that the PLL sets a low pass tracking filter for multipath suppression.

The fifth step deals with multipath suppression. Multipathing results from signals bouncing off of the intended target, hitting a farther target, reflecting back to the intended target and then back to the radar receiver. In some cases the multipath target is stronger than from the intended target, but they always result in a higher signal frequency in FMCW systems. This device has unique multipath suppression in that it actually switches off the multipath signal. The secondary channel signal, mentioned in the previous step, is amplified 28 and sent through another set of LMF100 switched capacitor filters 29 this time configured as low pass filters. The upper cutoff of the filter is set by the primary channel PLL 23. The voltage output on the CD4046 23 is used to drive a voltage/frequency converter 31 which produces a frequency about 25 times the secondary channel signal frequency. Since the frequency cutoff of the LMF100 29 is configured to 1/50th of its drive frequency, that essentially eliminates, or greatly suppresses, the frequency signal coming through the secondary channel, unless a multipathing signal is present. With multipathing, the primary channel goes to a higher frequency than it should. That pushes the cutoff frequency up on the low pass filter 29 causing the secondary channel to pass the intended target frequency even though it may be a considerably reduced level. The AGC/level detect circuit 33 built into the secondary channel detects the presence of the intended object and switch 47 switches the output 45 to the secondary channel information. The secondary sine wave information is processed the same way as the primary channel from that point on, i.e. through the comparators 35, 37, monostables 39, 41 and another PLL 43. The secondary channel is then switched on to become the output signal 45 which determines the range. Conversely, as soon as multipathing disappears, the output signal 45 again comes from the primary channel.

The secondary circuit detects the presence of signals in a frequency band below that which the primary circuit detects. If a signal is found in the band, then the secondary circuit causes the output 45 to switch to the lower band.

Figure 2:
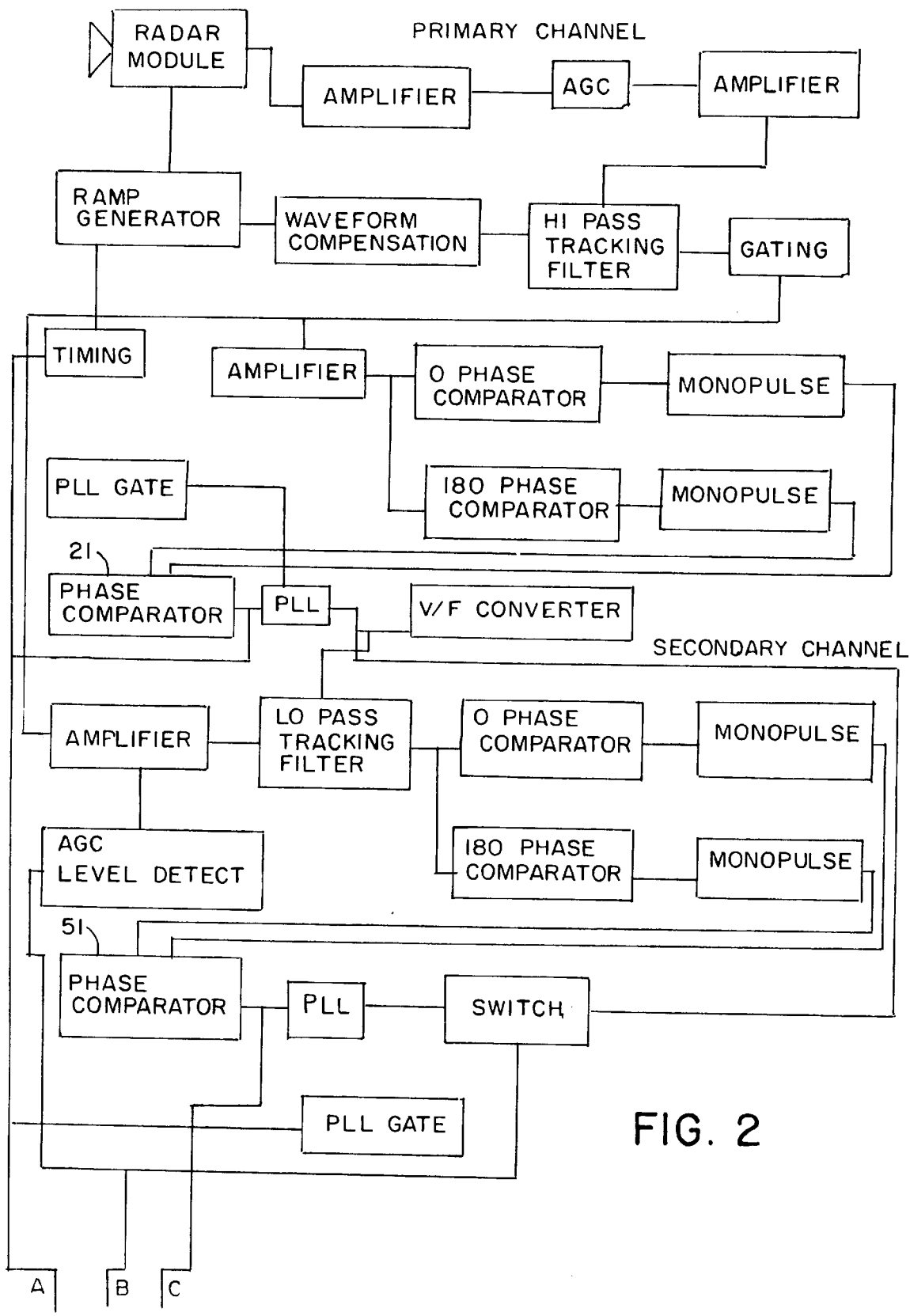
FIG. 2 is a block diagram of the second resolution enhancement method with multipath suppression.
Figure 2A:
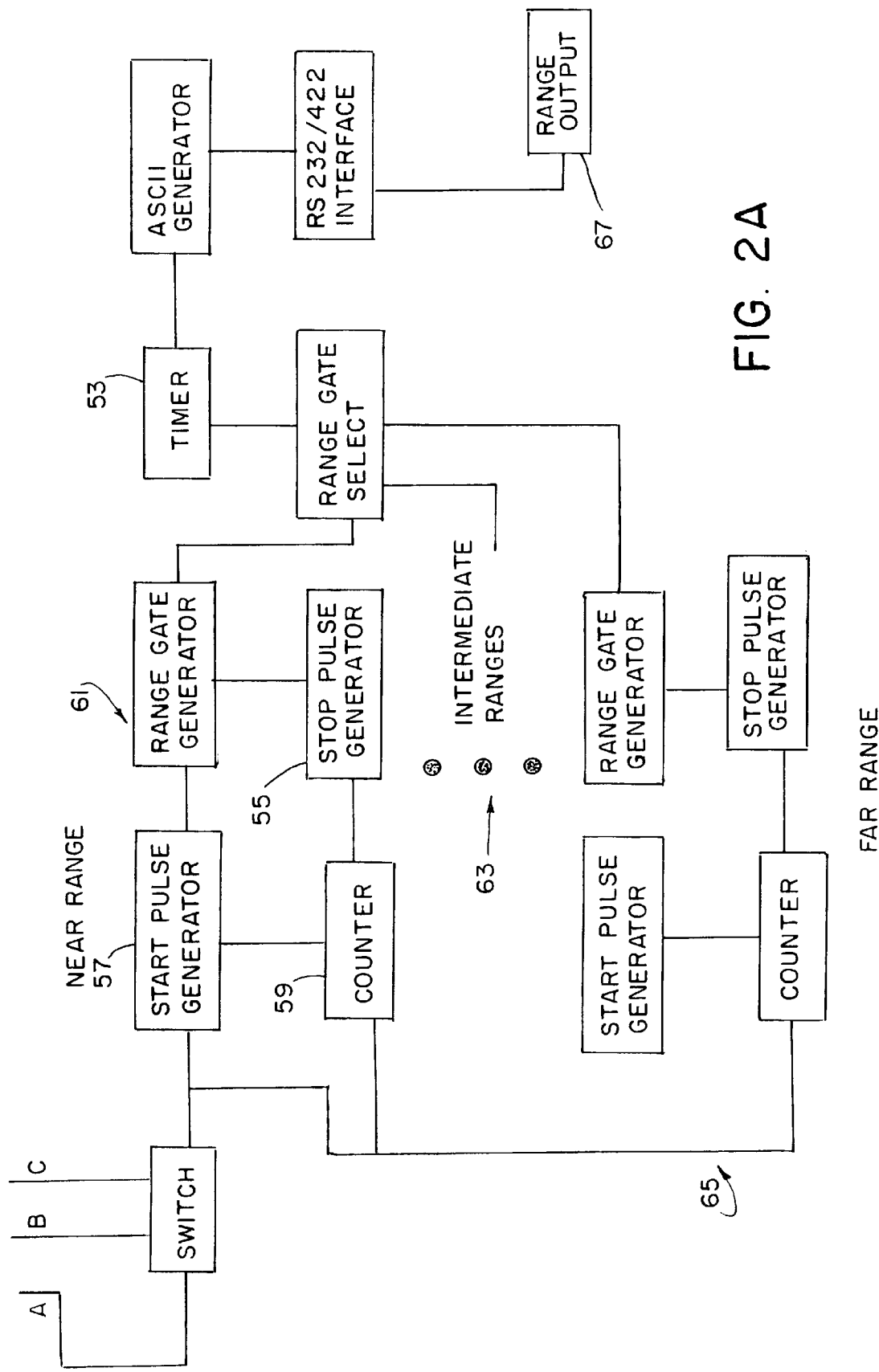

FIGS. 2 and 4 show a second method for resolution enhancement. The information signal is taken from either the phase comparator output 21 or from the comparator 51 output described in the first method. The information signal is then sent to a flip-flop circuit using a CD4013 D flip-flop 57, where a start time pulse is generated at some time after the start of each ramp cycle. That start pulse corresponds to the 0 degree phase crossing of the first sine wave excursion, although it can be programmed to start at any known phase crossing point. Simultaneously, a timing signal 53 is initiated which measures time until a stop pulse 55 is generated. A stop pulse 55 is generated after a predetermined number of counts, determined by counter 59, of pulses from the comparator 21, 51.

In the present unit three time measurements are made, one for near range 61, one for mid range 63 and one for far range 65. Any number of counts can be made and can be adjusted internally for the range to produce only one time measurement output 67. The stop pulses, one for each of the three time measurements, is generated by counting a fixed number of counts of the signal from the comparator. The time between the start pulse and the stop pulse is inversely proportional to the range. That is, as the signal frequency goes up, the time between any preselected number of counts gets correspondingly shorter. In one of the present configurations, the near range measurement is made from one count. At a range of about 1 meter, the time between the start pulse and the near range stop pulse is about 1 millisecond. At 2 meters range the time is 0.5 milliseconds. The range resolution is limited in this case only by the ability to measure increments of the start and stop pulse. Because the signal determines where the start and stop pulses are generated, the object can be moving with respect to the sensor and the resolution is not degraded.

The reason three stop pulses are generated is that at very near range only one count may be present during the ramp time. As the range increases, many more counts appear during the ramp time. Using incremental time measurements, the more counts measured the more increments of time, thus better resolution. Resolution is maintained regardless of the counts because each count is made at a particular phase crossing and not at a frequency count.

It is not necessary to take up printed circuit board space to measure the time increments. Most standard PC's can also perform the measurement so that the data is easily manipulated with software. Another advantage is that these relatively slow time measurements may be transmitted over long distances through wireless links or other mediums so that the sensor device may be in one location and the data displayed in another location with little or no degradation in resolution.

One range measurement 67 is made with each ramp so the data update rate is very high compared to other systems. The present device makes a range measurement every 10 milliseconds. It also combines the start and stop pulses to form a gate such that the leading edge starts the timer and the trailing edge stops the timer.

Figure 3:
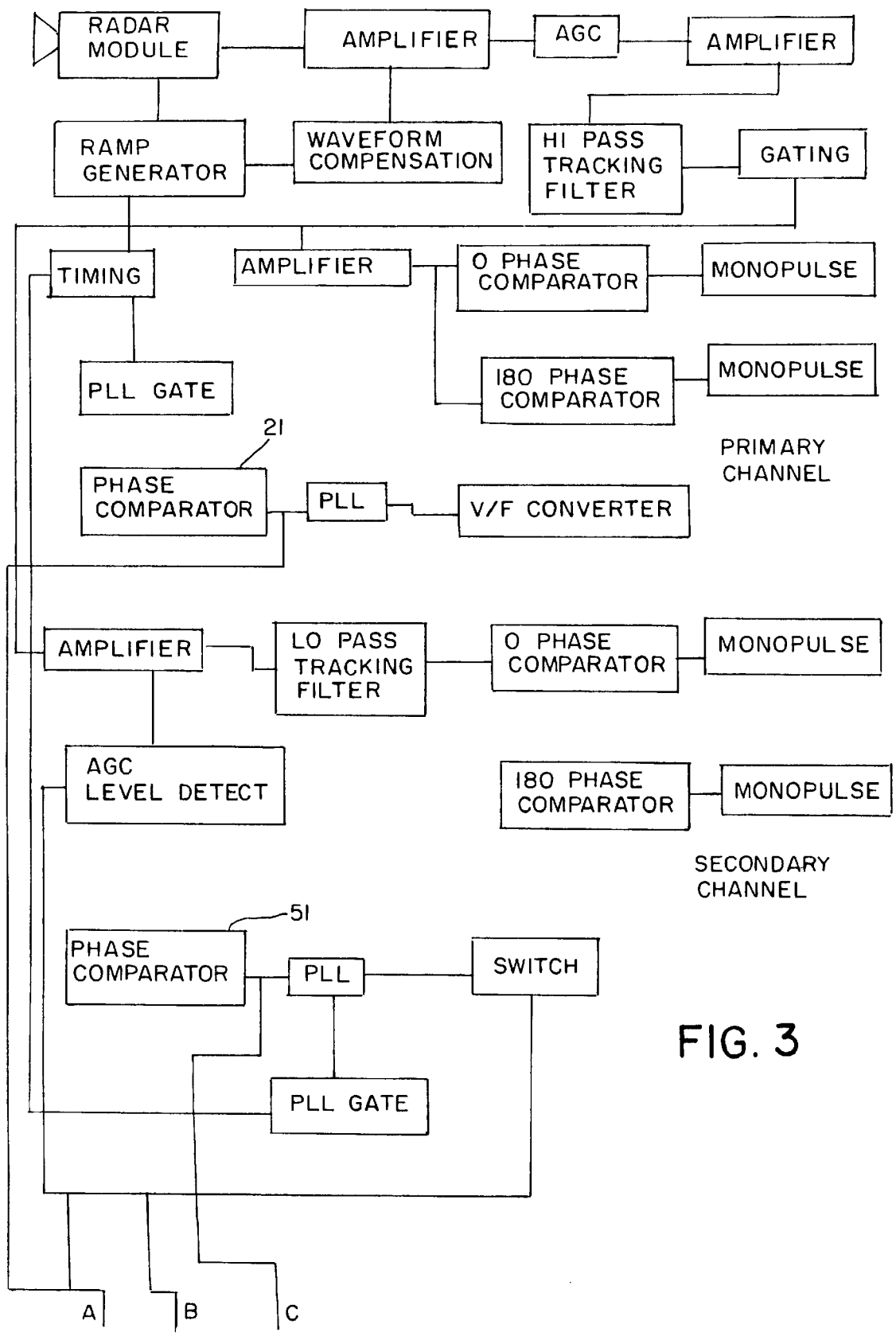
FIG. 3 is a block diagram of the third resolution enhancement method with mulitpath suppression.
Figure 3A:
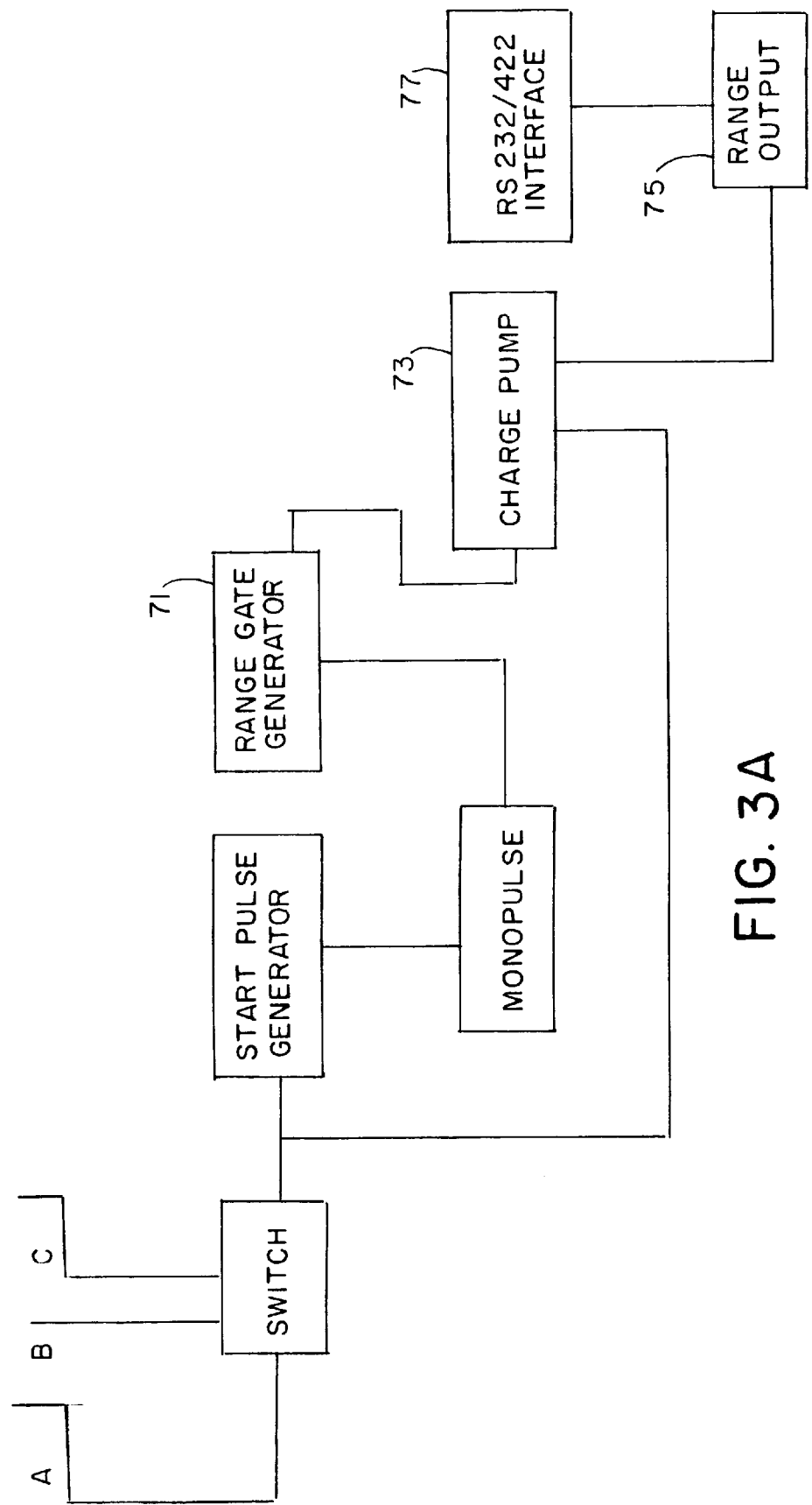

As in the first two methods for resolution enhancement, the signal is demodulated, amplified, gated, filtered and digitized. The third method for resolution enhancement, shown in FIGS. 3 and 5, starts as the signal exits the comparators 21, 51. A gate is generated by range gate generator 71 on the rising edge of the first 0 or 180 degree phase excursion. The gate allows the digitized signal to go to a charge pump device 73 which has an output proportional to the time interval of the digitized pulse or pulses. At a fixed time interval, a stop pulse is generated which resets the gate on the falling edge of the next 0 or 180 degree phase excursion. Simultaneously, the rising edge of the gate activates the charge pump device 73 and the falling edge deactivates it. The voltage output of the charge pump device 73 is then proportional to the range 75.

The charge pump 73 output voltage may be converted to range 75 display by many different methods. Most standard PC's 77 may also perform the measurement so that the data is easily manipulated with software. Another advantage is that these relatively slow time measurements may be transmitted over long distances through wireless links or other mediums so that the sensor device may be in one location and the data displayed in another location with little or no degradation in resolution.

One range measurement is made with each ramp so the data update rate is very high compared to other systems. The present device makes a range measurement every 10 milliseconds.

Figure 6:
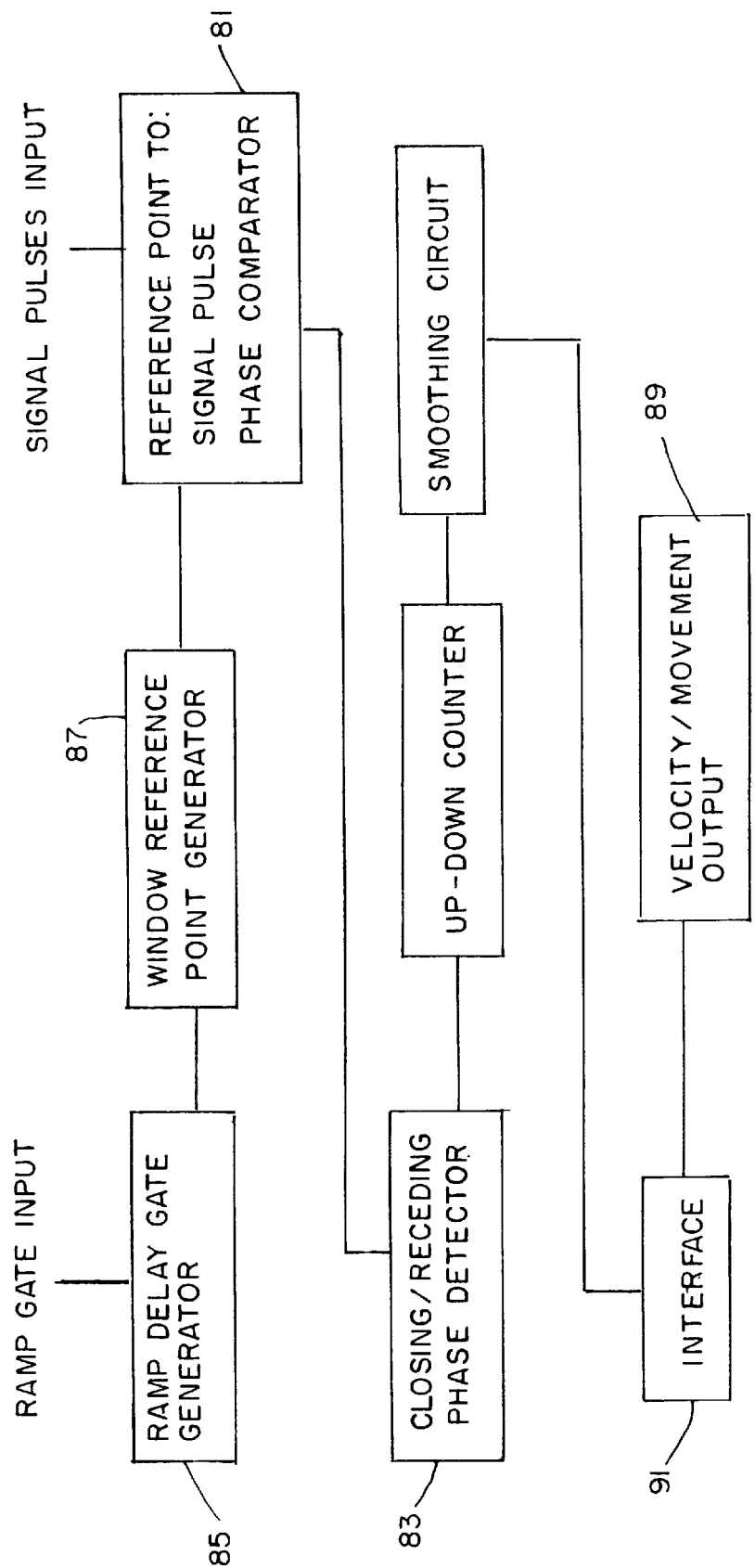
FIG. 6 is a block diagram showing velocity and fine movement measurement.

As shown in FIG. 6, the next step entails fine movement and velocity measurements. As the range to the object changes, the phase of the signal with respect to the ramp start time changes. Again using a CD4013 83, or any standard flip-flop, a circuit is configured to measure to measure the rising and/or falling edges of the comparator 81 output. The rate at which those edges change state as compared to the start of the ramp 85 are an accurate indication of the velocity 89 of the target. The present device measures velocities from 0.000001 meter per second up to 1 meter per second, although those are not limits of the system. Indeed, the device may be configured to measure nearly all velocities of the signal sent to the device. The phase stability of the transceiver module is the only limitation. That also means that only velocities in the range window 87 for which the device is selected to operate are measured.

Preselecting the minimum and maximum ranges is accomplished in the eighth step. Referring back to the high pass filter mentioned in step three and the low pass filter mentioned in step five, those filters may be programmed to have fixed frequency cutoffs simply by adding a potentiometer to the inputs of the V/F converter. By adjusting the potentiometer the minimum detectable range of the device is set. Similarly, the filters may be adjusted by an external source, such as a computer 91. That high pass circuit may be used as is to set the minimum range. Another high pass circuit may be added in series to set the minimum range without disturbing the other device functions. The more poles the filter has, the sharper the minimum range cutoff.

Similarly, the maximum range may be set by adding a tunable low pass filter in the same signal path. Although most of the many clock tunable low pass filters available will work in the circuit, the present device uses a configurable LMF100. The more poles the filter has the sharper the cutoff, thus the sharper the maximum range window. Although not used in the present circuit, tunable bandpass filters may also be used to control the range window.

While the invention has been described with reference to specific embodiments, modifications and variations of the invention may be constructed without departing from the scope of the invention, which is defined in the following claims.

I claim:

1. An ultra high resolution ranging unit comprising a transmitter for transmitting a swept frequency, a receiver for receiving an echo of the swept frequency, a decoder connected to the receiver for decoding the received echo and producing a phase gate, a converter connected to the decoder for comparing phases, and an indicator for indicating distant measurement according to the phases.

2. The apparatus of claim 1, wherein the transmitter is a frequency modulated continuous wave transmitter with a varactor tuner and a volt ramp connected to the varactor tuner for sweeping a transmitted frequency, and wherein the receiver includes an internal demodulator for demodulating the frequency modulated continuous wave echo.

3. The apparatus of claim 2, wherein the receiver further comprises an amplifier and a high bandpass filter connected to the amplifier and an automatic gain control connected to the high bandpass filter, a second amplifier connected to the automatic gain control and a bandpass filter connected to the second amplifier, a controller connected to the bandpass filter for controlling low frequency cutoff according to range, and a gate connected to the bandpass filter for eliminating unwanted flyback or reset signals.

4. The apparatus of claim 3, further comprising a splitter connected to the gate for splitting the signals into first and second channels, an analog-to-digital converter connected to the first channel, a first comparator connected to the converter for creating a pulse at a leading edge phase of each sinewave, a second comparator connected to the converter for creating a second pulse at a trailing edge of each sinewave, a monopulse generator connected to the first and second comparators for generating a fixed pulse from each pulse from the first and second comparators, and an adder connected to the monopulse generator for adding the pulses.

5. The apparatus of claim 4, further comprising first and second comparators connected to the converter for generating pulses at different positions on the sinewave.

6. The apparatus of claim 4, further comprising a phase locked loop circuit connected to the adder, a gate connected to the phase locked loop circuit for gating a phase air signal off during ramp flyback.

7. The apparatus of claim 6, wherein the phase locked loop circuit is connected to a low pass filter in the bandpass filter for adjusting low frequency cutoff.

8. The apparatus of claim 7, further comprising an amplifier connected to the second channel, low pass filters connected to the amplifier in the second channel, the low pass filters connected to the phase locked loop circuit in the first channel for adjusting upper cutoff of the low pass filters, the second channel having first and second comparators connected to the low pass filter, a monopulse generator connected to the first and second comparators, an adder connected to the monopulse generator and a second phase locked loop circuit connected to the adder in the second channel, a switch connected to the phase locked loop in the first channel and a switch connected to the phase locked loop in the second channel, and an output connected to the switch for switching output from the first channel to the second channel.

9. The apparatus of claim 8, further comprising a ranging switch connected to phase comparator outputs in the first and second channels, a start pulse generator connected to the ranging switch, a counter connected to the start pulse generator, a stop pulse generator connected to the counter, a range gate generator connected to the start pulse generator and the stop pulse generator, a range gate selector connected to the range gate generator, a timer connected to the range gate selector, and a range output connected to the timer.

10. The apparatus of claim 9, further comprising second and third counters connected to the ranging switch, second and third start pulse generators connected to the second and third counters respectively, second and third stop pulse generators connected to the second and third counters respectively, second and third range gate generators connected to the second and third start pulse generators and second and third stop pulse generators respectively and connected to the range gate selector.

11. The apparatus of claim 8, further comprising a ranging switch connected to the phase comparators in the first and second channels, a start pulse generator connected to the ranging switch, a monopulse generator connected to the start pulse generator, a range gate generator connected to the monopulse generator, a charge pump connected to the ranging switch and to the range gate generator, and a range output connected to the charge pump.

12. The apparatus of claim 8, further comprising a computer interface connected to the range output for displaying range and determining speed from rate of change of range.

13. Ultra high resolution ranging apparatus, comprising a radar module, a ramp generator connected to the radar module, an amplifier connected to the radar module, a waveform compensator connected to the amplifier and to the ramp generator, an automatic gain control connected to the amplifier, a second amplifier connected to the automated gain control, and a high pass tracking filter connected to the second amplifier, a gating circuit connected to the high pass tracking filter, a primary channel amplifier and a secondary channel amplifier connected to the gating circuit, a low pass tracking filter connected to the secondary channel amplifier, a first set of phase comparators connected to the primary channel amplifier and a second set of phase comparators connected to the low pass tracking filter, monopulse generators connected to the sets of phase comparators, monopulse phase comparators connected to the monopulse generators, phase locked loop circuits connected to the monopulse phase comparators, a VF converter connected to the phase locked loop comparator in the first channel and connected to the low pass tracking filter in the second channel, a switch connected to the phase locked loop circuit in the first channel and to the phase locked loop circuit in the second channel, and an output connected to the switch.

14. The apparatus of claim 13, further comprising a secondary channel automatic gain control connected to the amplifier and connected to the switch.

15. The apparatus of claim 13, further comprising a timing circuit connected to the ramp generator, and first and second phase locked loop gates connected to the timing generator and respectively connected to the primary channel phase locked loop circuit and the secondary channel phase locked loop circuit.

16. The apparatus of claim 13, further comprising a second switch connected to the first switch and connected to the monopulse phase comparators, first, second and third counters connected to the second switch, first, second and third start pulse generators connected to the first, second and third counters, first, second and third stop pulse generators connected to the first, second and third counters, first, second and third range gate generators connected to the first, second and third start pulse and stop pulse generators, a range gate selector connected to the range gate generators, a timer connected to the range gate selector, an ASCII generator connected to the timer, a computer interface connected to the ASCII generator, and a range output connected to the computer.

17. The apparatus of claim 13, further comprising a second switch connected to the first switch and connected to an AGC level detector which is connected to the secondary channel amplifier, the second switch being connected to the monopulse phase comparators in the primary and secondary channels, a start pulse generator connected to the second switch, a monopulse generator connected to the start pulse generator, a range gate generator connected to the monopulse generator, a charge pump connected to the second switch and to the range gate generator, and a range output connected to the charge pump.

18. The apparatus of claim 17, further comprising a computer interface connected to the range output.

19. A method of ultra high resolution ranging, comprising generating a frequency modulated continuous wave signal, sweeping the signal, transmitting the signal, receiving echo signals, high pass filtering and gating the echo signals, amplifying the gated signals in primary and secondary channels, low pass filtering the amplified signals in the secondary channel, creating phase comparator signals from the amplified and low passed signals in the primary and secondary channels, creating monopulse signals and phase preparing the monopulse signals and creating phase locked loop signals in the primary and secondary channel, controlling the low pass tracking filter with the phase locked loop signal from the primary channel, and switching output from the primary channel to the secondary channel.

20. The method of claim 19, further comprising providing timing signals for sweeping and for gating pulse locked loop circuits in the primary and secondary channels for avoiding flyback signals.

21. The method of claim 20, further comprising monopulse phase comparator signals from the first and second channels to a second switch, supplying signals from the second switch to first, second and third counters, generating first, second and third start pulses and stop pulses and generating first, second and third range gate signals with the start and stop pulses, selecting and timing selected range gate signals and providing the time signals to a computer for providing a range output and rate of change speed output.

22. The method of claim 20, further comprising providing signals from phase comparators in the primary channel and the secondary channel to a second switch, generating a start pulse with a signal from the second switch, generating a monopulse with the start pulse and generating a range gate signal with the monopulse, supplying the range gate signal and the signal from the switch to a charge pump and providing an output from the charge pump.

* * * * *